United States Patent
Joshi et al.

(10) Patent No.: US 7,963,721 B2
(45) Date of Patent: Jun. 21, 2011

(54) DISTRIBUTED BUOYANCY SUBSEA PIPELINE APPARATUS AND METHOD

(75) Inventors: Khamir Girish Joshi, Sugar Land, TX (US); John Christian Hartley Mungall, Houston, TX (US); Craig Wonder Lamison, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 10/711,487

(22) Filed: Sep. 21, 2004

(65) Prior Publication Data

US 2006/0067792 A1    Mar. 30, 2006

(51) Int. Cl.
*F16L 1/16*    (2006.01)
(52) U.S. Cl. ...................................................... 405/171
(58) Field of Classification Search ................ 405/168.1, 405/169–172, 158; 114/243
See application file for complete search history.

(56) References Cited

U.S. PATENT DOCUMENTS

| | | | |
|---|---|---|---|
| 3,111,926 A | 11/1963 | Shatto, Jr. | |
| 3,173,271 A * | 3/1965 | Wittgenstein | 405/172 |
| 3,524,325 A * | 8/1970 | Brown | 405/169 |
| 3,658,366 A * | 4/1972 | Welch et al. | 285/24 |
| 3,698,348 A | 10/1972 | Morgan | |
| 3,835,656 A | 9/1974 | McDermott | |
| 4,075,862 A * | 2/1978 | Ames | 405/169 |
| 4,100,752 A * | 7/1978 | Tucker | 405/170 |
| 4,274,757 A | 6/1981 | Francisco-Arnold | |
| 4,906,137 A * | 3/1990 | Maloberti et al. | 405/224.3 |
| 4,909,670 A * | 3/1990 | Harrison | 405/168.2 |
| 5,275,510 A | 1/1994 | de Baan et al. | |
| 5,425,599 A | 6/1995 | Hall et al. | |
| 5,582,252 A * | 12/1996 | Richmond et al. | 166/352 |
| 5,615,977 A * | 4/1997 | Moses et al. | 405/195.1 |
| 6,062,769 A | 5/2000 | Cunningham | |
| 6,109,830 A * | 8/2000 | de Baan | 405/170 |
| 6,109,833 A | 8/2000 | Savy | |
| 6,595,725 B1 | 7/2003 | Shotbolt | |
| 6,763,862 B2 | 7/2004 | Fontenot et al. | |
| 6,811,355 B2 | 11/2004 | Poldervaart | |
| 6,910,831 B2 | 6/2005 | Raines | |
| 2005/0158126 A1* | 7/2005 | Luppi | 405/224.2 |
| 2008/0056825 A1 | 3/2008 | Joshi et al. | |

FOREIGN PATENT DOCUMENTS

GB    2273087 A    6/1994
WO    WO 2004/068014 A1    8/2004

OTHER PUBLICATIONS

Walid Soliman, et al., "Offshore Technology Challenges—The Sigsbee Escarpment," KBR Offshore, Issue 7, Jun. 2003, Houston, TX.
Gunnar Paulsen, et al., "Submerged Floating Pipeline in Deep Water," International Offshore & Polar Engineering Conference, May 28, 2000, Seattle WA.

* cited by examiner

*Primary Examiner* — Sunil Singh
(74) *Attorney, Agent, or Firm* — KBR IP Legal Dept.

(57) ABSTRACT

Apparatuses including a subsea pipeline (18) extending from a first location (14) to a second location (16) and including at least one distributed buoyancy region (102) to traverse a seabed topographic feature (12) are presented. Methods including laying a subsea pipeline (218) including laying a negatively buoyant section of pipeline (218A), a distributed buoyancy section (202) of pipeline (218), and a second negatively buoyant section of pipeline (218B) from a pipelay vessel (220) to traverse an undersea topographic feature (212) are also presented.

19 Claims, 11 Drawing Sheets

DISTRIBUTED BUOYANCY SUBSEA PIPELINE APPARATUS AND METHOD

BACKGROUND OF THE INVENTION

The pursuit of petroleum products in deep waters has revealed an underwater world completely different from a level or gradually sloping seabed. Far off the coast, unlike relatively featureless continental shelves where most offshore oil and gas has been historically developed, the deep-water ocean bottom has hazardous topographic features that can compromise pipelines and subsea structures. These topographic features include enormous basins, domes, valleys, cliffs, canyons, and escarpments.

An escarpment, or scarp, is a steep slope or cliff formed by erosion or faulting. The Sigsbee Escarpment, for example, is the largest in the Gulf of Mexico and lies beyond the edge of the continental shelf thousands of feet below the sea surface. The Sigsbee Escarpment encompasses drops of hundreds to over a thousand feet and extends for hundreds of miles. Between the Sigsbee Escarpment and the continental shelf exists a region called the continental slope. Because of the randomness and variability of the salt and sediment deposits, the topography of the continental slope is a complex landscape with many scarp-like features.

This complex topography is a significant challenge to laying subsea pipeline across these regions. The abrupt changes in the slope across such topographic features and escarpments can cause pipelines crossing them to bend sharply. This bending leads to ovalization of the pipeline cross section which may cause the pipeline to buckle and collapse. Large free spans exceeding the stress and vortex induced vibration fatigue limits of the pipeline can also result from seabed irregularities associated with these topographic features.

Subsea pipelines are most often used to transport production fluids from offshore facilities to land or to other offshore facilities. Such fluids include, but are not limited to, gases (methane, ethane, etc.), liquid hydrocarbons, additives (diluents added to heavy fluids, or corrosion control additives), or any mixture thereof. These pipelines typically rest on the ocean bottom and can extend for miles at depths exceeding 3500 feet (1050 m) of water. Many issues arise with respect to the laying of subsea pipelines including countering the subsea currents, traversing the varying topography, and the complexity of the installation process itself. Existing solutions for spanning the treacherous topographic features described above can be costly, risky, environmentally destructive, or result in other hazards.

Existing solutions include re-routing pipelines through existing valleys or canyons where the slope is more gradual, drilling subsea conduits, and blasting or trenching the undersea topography to provide a better support profile for the pipeline. The re-routing option can be time consuming and expensive because it requires a longer pipeline. The trenching, blasting, and drilling options can have a negative impact on the undersea environment and sea life and can likewise be very costly. Other options, including the installation of rigid pilings and framework to support pipeline spans have been tried on smaller scale installations, but would be very costly on longer spans.

Undersea pipelines are crucial to the low cost delivery of production fluids (hydrocarbons) from offshore facilities to land or to other offshore facilities. If pipelines are not available, the hydrocarbons must be transported via tankers or some other means to the coast. Pipelines are generally considered lower risk than tankers because there is significantly less risk of maritime collisions and there are fewer exchanges (platform to tanker; tanker to shore facility) of the hydrocarbons. The hazardous topography of the continental slopes increases the risk (through stresses and failures) that leaks may occur. A solution that safely allows pipelines to traverse hazardous topography in a manner that is more cost effective and environmentally responsible would be highly desirable.

BRIEF SUMMARY OF THE INVENTION

The deficiencies of the prior art are addressed by methods and apparatuses to elevate a subsea pipeline section using distributed buoyancy to facilitate the traversal of steep underwater slopes, hazardous topographic features, and other varied irregularities on the seabed.

One embodiment of the invention is an apparatus that includes a subsea pipeline to traverse a topographic feature, the pipeline including at least one distributed buoyancy region. The pipeline includes a first section extending from a first location to a distributed buoyancy region and the second region extending from the distributed buoyancy section to a second location. The distributed buoyancy region connects the first and second pipeline sections to one another and allows fluid communication therethrough. Optionally, the distributed buoyancy region can be a plurality of buoyancy modules or can be a continuous coating of buoyant material. Optionally, the pipeline can include a tether system to retain the pipeline in place and to resist undersea currents. The apparatus can include a flexure control device at the first location, the second location, or both the first and second locations. The flexure control device can be offset from a cliff edge at the first or second location. Optionally, the distributed buoyancy region can be either positively buoyant or negatively buoyant.

One method for traversing an undersea topographic feature with a subsea pipeline includes laying a negatively buoyant first section of the pipeline from a pipelay vessel from a first location on a sea floor. The method includes laying a positively buoyant distributed buoyancy section of the pipeline from the pipelay vessel over the topographic feature. The method then includes laying a negatively buoyant second section of the pipeline from the pipelay vessel to a second location on the sea floor. Optionally, the first section, the distributed buoyancy section, and the second section are joined together aboard the pipelay vessel and subsequently laid as a single continuous pipeline.

Another method for traversing an undersea topographic feature with a buoyed pipeline includes installing a first and second completed pipelines at first and second respective locations with the first completed pipeline terminating at a first connection device and the second completed pipeline terminating at a second connection device. The method can include laying the buoyed pipeline with a first mating device at a first end and a second mating device at a second end. The method can include landing the first mating device proximate to the first connection device and the second mating device proximate the second connection device. The method can include installing a first fluid connection between the first connection device and the first mating device and a second fluid connection between the second connection device and the second mating device.

A method for connecting a first pipeline to a second pipeline across an undersea topographic feature includes laying a distributed buoyancy pipeline across the topographic feature. The distributed buoyancy pipeline includes a first mating device at a first end and a second mating device at a second end. The method optionally includes landing the first mating device proximate to a first connection device of the first pipeline and landing the second mating device proximate to a second connection manifold of the second pipeline. The method includes installing a first fluid connection between the first connection device and the first mating device and installing a second fluid connection between the second connection device and the second mating device.

BRIEF DESCRIPTION OF THE DRAWINGS

For a more detailed description of the embodiments of the present invention, reference will be made to the accompanying drawings, wherein.

DETAILED DESCRIPTION OF THE EMBODIMENTS

Figure 1A:
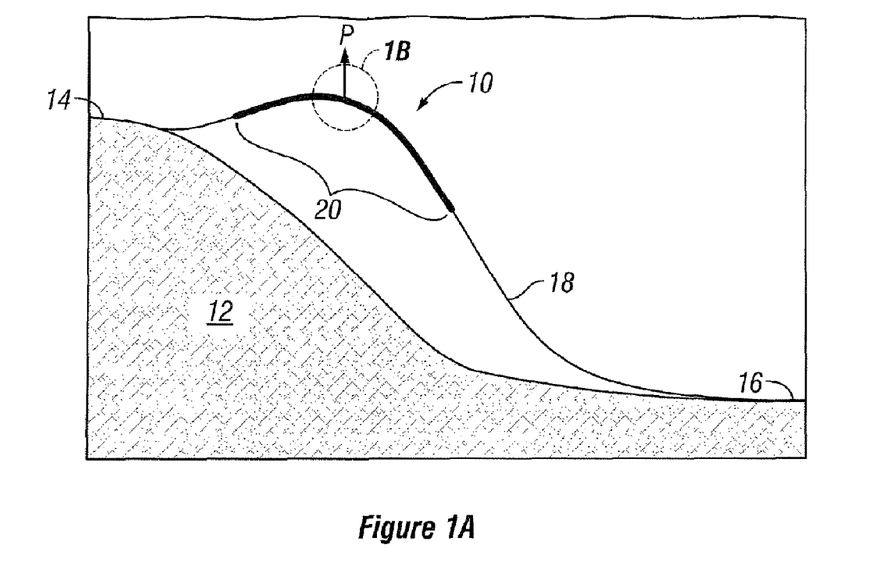
FIG. 1A is a schematic representation of a distributed buoyancy pipeline in accordance with an embodiment of the present invention.
Figure 1B:
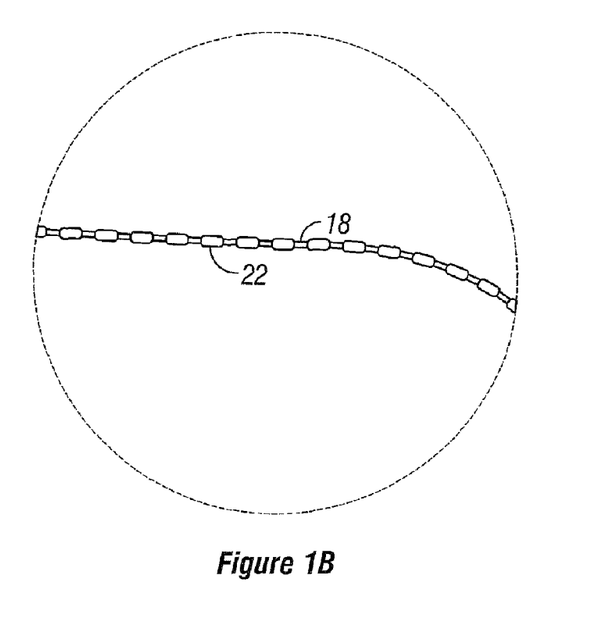
FIG. 1B is a close up view of a distributed buoyancy region of the distributed buoyancy pipeline of FIG. 1A.

Referring initially to FIGS. 1A and 1B, a distributed buoyancy pipeline system 10 is shown. Distributed buoyancy system 10 is shown traversing a scarp 12 and extends from the top 14 of scarp 12 to the bottom 16 of scarp 12. Distributed buoyancy system 10 includes a length of pipeline 18 in an arc-shaped configuration as it traverses scarp 12. While a scarp 12 is shown, it should be understood to one of ordinary skill in the art that various other topographic obstructions and hazards including, but not limited to, basins, domes, valleys, cliffs, and canyons, may be traversed without departing from the spirit of the invention.

To traverse scarp 12, a distributed buoyancy section 20 is located along pipeline 18 to create a region of positive buoyancy P. Distributed buoyancy section 20 is shown in FIG. 1B as a region of spaced generally circumferential buoys 22 about pipeline 18, but other distributed buoyancy solutions can be deployed. For example, pipeline 18 can be constructed to include other distributed buoyancy schemes known to those skilled in the art including, but not limited to, integral buoyancy features, applied buoyancy coatings, and tethered buoyancy elements. Distributed buoyancy section 20 is desirably constructed so as to avoid any localized stresses or strains in affected pipeline 18, which might otherwise result in fatigue of pipeline 18 cross-section, thereby negating the benefits of distributed buoyancy system 10 and risking rupture of pipeline 18.

Pipeline 18 is deployed with distributed buoyancy section 20 so that it is laid in the shape of an inverse catenary or wave that completely spans scarp 12 without intermittent contact between pipeline and slope of scarp 12. Furthermore, as will be described in more detail below, the wave shape of pipeline 18 allows for a spanning of scarp 12 without contacting any potential hazard areas at the top or bottom of the slope of scarp 12.

Referring generally now to FIGS. 2A-2K, several different deployments of undersea pipelines 18 traversing scarps 12 are shown. FIGS. 2A-2K are merely schematic in nature and therefore are solely for the purpose of describing some of the particular configurations available under the present invention. No specific material or component requirements are to be inferred from viewing the schematics. Furthermore, the reader is not to assume that FIGS. 2A-2K are drawn to any particular or consistent scale or to reflect relative stress conditions. Furthermore, it should be understood by one of ordinary skill in the art that additional tethers 19 ( depicted in FIGS. 2H and 2I) could be added to stabilize the various embodiments of undersea pipelines 18 traversing scarps 12. These tethers 19, while not necessarily a primary structural support for the pipeline 18 installations, offer secondary restraint to limit the displacement of pipelines 18 as a result of undersea currents. Such tethers 19 can be installed and secured using methods and apparatuses well known to one skilled in the art.

Figure 2A:
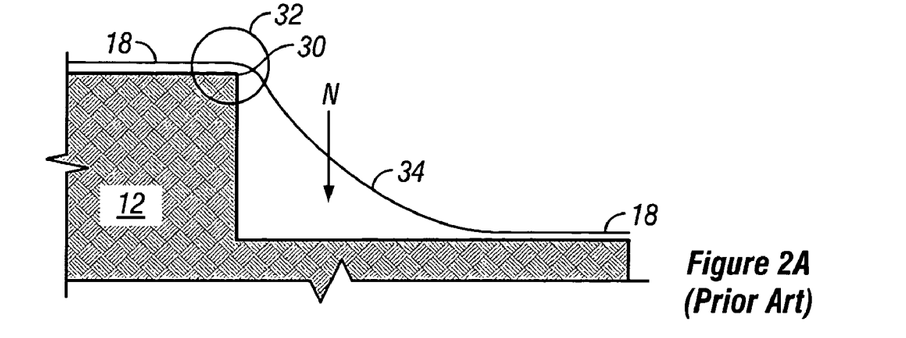
FIG. 2A is a schematic representation of an unbuoyed pipeline span crossing a topographic feature.

Referring specifically to FIG. 2A, an unbuoyed pipeline 18, a span having negative buoyancy N, traversing a scarp 12 is shown. Because pipeline 18 experiences an abrupt change in direction at scarp 12 without stress or strain relief, ovalization and failure are likely to occur in region 32 of the pipeline.

Figure 2B:
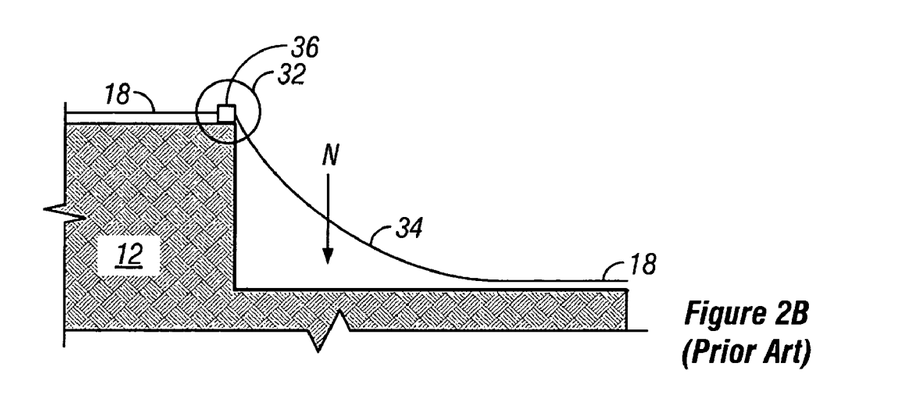
FIG. 2B is a schematic representation of an unbuoyed pipeline span crossing a topographic feature and connected to a flexure control device at its upper end.

Referring now to FIG. 2B, unbuoyed undersea pipeline 18 system is shown traversing an undersea scarp 12. In this schematic, the stress condition of pipeline 18 has been improved through the addition of a flexure control device 36. Flexure control device 36 can be a flex joint or a tapered stress control joint as would be known to those skilled in the art. Flexure control devices 36 can act either to allow the stress-free bending of pipeline 18 or to reduce the local stress experienced by pipeline 18 as it bends. Furthermore, flexure control device 36 can act as an anchor to resist displacement of pipeline 18 resulting from currents and other forms of loading. By adding flexure control device 36, the likelihood of ovalization of pipeline 18 at region 32 is greatly diminished. Depending on topography, for example, when the angle of scarp 12 is less than 90° to the horizontal, high tension may be required in pipeline 18 to support it clear of the seabed. However, stresses, strains, and likelihood of failure at unbuoyed region 34 are not eliminated merely through the addition of flexure control device 36. While less than those experienced at region 32 without flexure control device 36, the stresses and strains at region 34 can still be unsatisfactory to ensure against catastrophic pipeline failure.

Figure 2C:
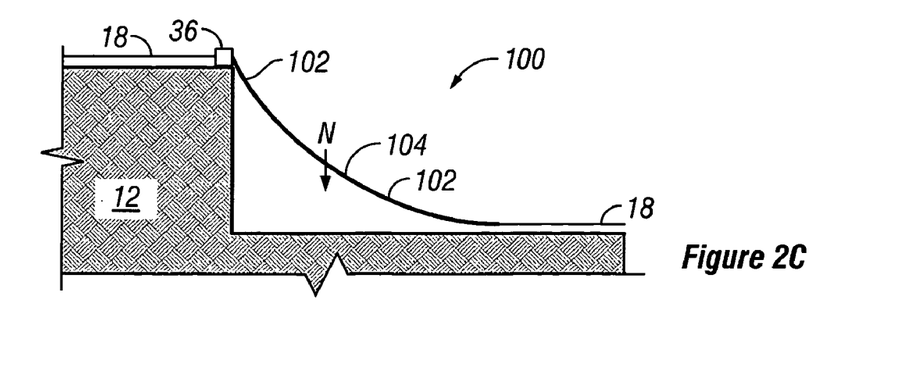
FIG. 2C is a schematic representation of the pipeline span of FIG. 2B with a distributed buoyancy system in accordance with an embodiment of the present invention.

Referring now to FIG. 2C, a schematic representation of a distributed buoyancy pipeline system 100 in accordance with a first embodiment of the invention is shown. Distributed buoyancy system 100 includes a combination of pipeline 18 and flexure control device 36 traversing scarp 12. Additionally, distributed buoyancy pipeline system 100 includes a buoyed section 102 of pipeline along the scarp 12 span 104. The pipeline 18 of FIG. 2C is not completely supported by buoyancy and therefore span 104 has a net negative buoyancy N, however it is lower in magnitude that that of region 34 of FIG. 2B, for example, at least 50 percent less, thereby reducing tension in pipeline 18 in span 104.

Figure 2D:
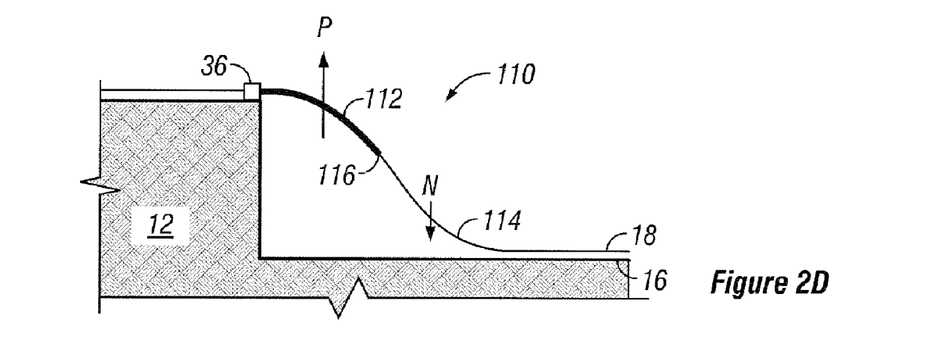
FIG. 2D is a schematic representation of the pipeline span of FIG. 2B with a distributed buoyancy system in accordance with a second embodiment of the present invention.

Referring now to FIG. 2D, a schematic representation of a distributed buoyancy pipeline system 110 in accordance with a second embodiment is shown. Distributed buoyancy pipeline system 110 traverses scarp 12 through the use of flexure control device 36 and two sections of pipeline 18, one upper buoyant section 112, and one lower unbuoyed section 114. Buoyant section 112 exhibits positive buoyancy P and unbuoyed section 114 exhibits negative buoyancy N. As a result, pipeline 18 exhibits an S-shaped curve as it traverses scarp 12. The positive buoyancy of upper section 112 acts to relieve stresses in pipeline 18 at or near the connection with flexure control device 36. The negative buoyancy of lower section 114 allows the pipeline to lie on the sea floor at the bottom 16 of scarp 12.

The combination of positively buoyant section 112 and negatively buoyant section 114 enables pipeline 18 to exhibit a smooth, gradual S-curve as it traverses scarp 12. This S-curve reduces the stresses and strains experienced by the cross-section of pipeline 18 in the region of flexure control device 36. Clearances between the span of pipeline 18 and the bottom 16 of scarp 12 are increased.

Figure 2E:
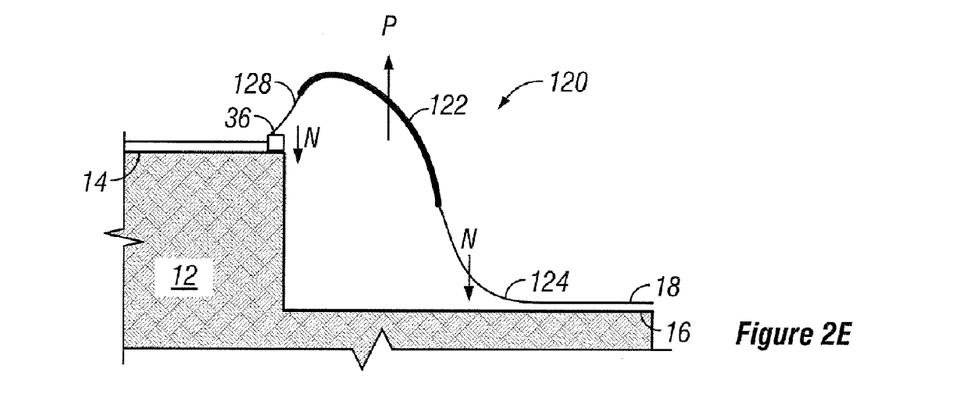
FIG. 2E is a schematic representation of the pipeline span of FIG. 2B with a distributed buoyancy system in accordance with a third embodiment of the present invention.

Referring now to FIG. 2E, a schematic representation of a distributed buoyancy pipeline system 120 in accordance with a third embodiment is shown. Distributed buoyancy pipeline system 120 traverses scarp 12 from flexure control device 36 to bottom 16. Distributed buoyancy system 120 includes two primary sections, an upper positively buoyed section 122 exhibiting positive buoyancy P, and a lower negatively buoyed section 124 exhibiting a negative buoyancy N. Furthermore, a negatively buoyed section 128 connects upper section 122 to flexure control device 36. Distributed buoyancy pipeline system 120 is desirably constructed such that buoyancy of upper section 122 is such that pipeline 18 rises above flexure control device 36 at the top 14 of scarp 12 before connecting to lower section 124 to form the S-curve as pipeline 18 traverses scarp 12. Buoyancy of upper section 122 is also enough to prevent any buckling or excessive bending of section 128. Differences in the amount of buoyancy and the lift of pipeline 18 above flexure control device 36 allow for different S-curves to be created.

Figure 2F:
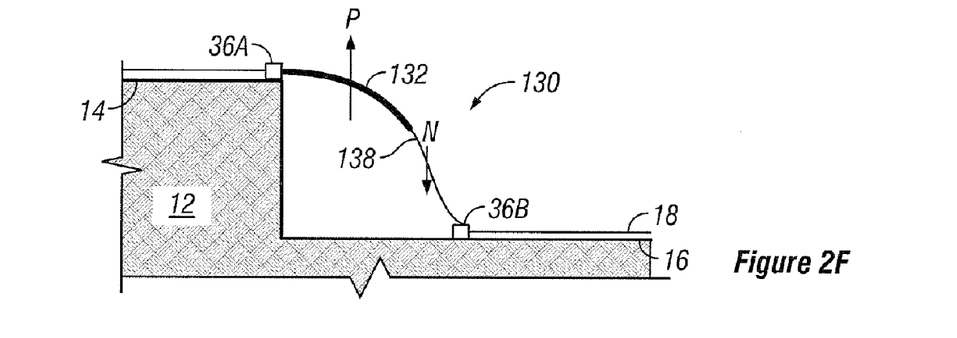
FIG. 2F is a schematic representation of a pipeline span having a distributed buoyancy system and crossing a topographic feature connected to a flexure control devices at each end in accordance with a fourth embodiment of the present invention.

Referring now to FIG. 2F, a schematic representation of a distributed buoyancy pipeline system 130 in accordance with a fourth embodiment is shown. Distributed buoyancy pipeline system 130 includes a pipeline crossing from an upper end 14 to the bottom 16 of a scarp 12 through upper and lower flexure control devices 36A, 36B. Pipeline 18 desirably includes an upper, positively buoyed section 132 and a lower, negatively buoyed section 138. Pipeline system 130 is more restricted in its freedom of movement than the embodiments discussed above because of its use of two flexure control devices 36A and 36B. Because flexure control devices 36A, 36B also act as anchors for pipeline 18, system 130 is well suited for situations where pipeline 18 needs to be more constrained against undersea currents or other events that might displace pipeline 18. Furthermore, the buoyancy of section 132 is enough to maintain control of any bending stress or strain in section 138 of pipeline 18. The length of sections 132 and 138 and the amount of buoyancy used in upper section 132 are designed to beneficially allow pipeline system 130 to gently arc from first flexure control device 36A to the second one at 36B, thereby reducing stresses.

Figure 2G:
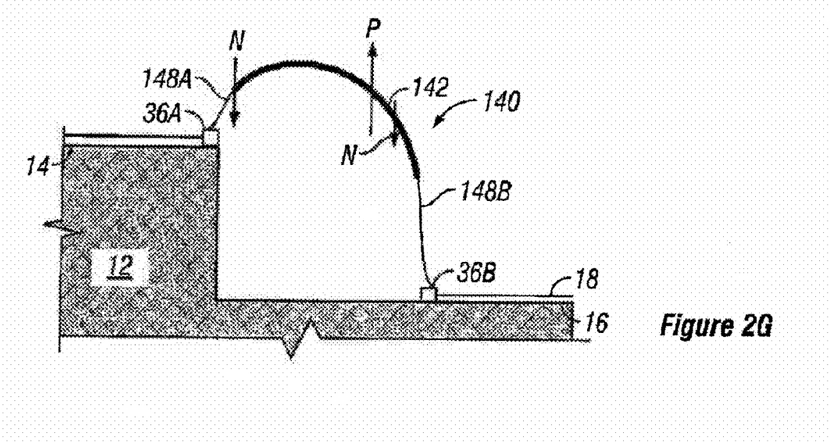
FIG. 2G is a schematic representation of the pipeline span of FIG. 2F with a distributed buoyancy system in accordance with a fifth embodiment of the present invention.

Referring next to FIG. 2G, a schematic representation of a distributed buoyancy pipeline system 140 is shown in accordance with a fifth embodiment. Like system 130 of FIG. 2F, pipeline system 140 includes upper and lower flexure control devices 36A, 36B to traverse pipeline 18 across scarp 12. Distributed buoyancy pipeline system 140 includes a positive buoyancy section 142 and two negative buoyancy sections 148A and 148B. Positively buoyant section 142 is designed so that any curves in pipeline system 140 are slight enough to be well within the structural limitations of pipeline 18.

Figure 2H:
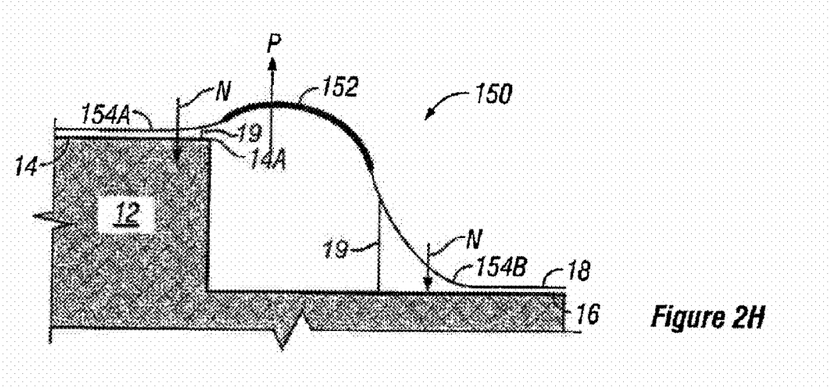
FIG. 2H is a schematic representation of a free pipeline span having a distributed buoyancy system and crossing a topographic feature in accordance with a sixth embodiment of the present invention.

Referring now to FIG. 2H, a schematic representation of a distributed buoyancy pipeline system 150 in accordance with a sixth alternative embodiment is shown. Unlike systems of FIGS. 2B-2G, distributed buoyancy pipeline system 150 of FIG. 2H does not include a flexure control device. Instead, distributed buoyancy system 150 includes a pipeline 18 extending from an upper portion 14 of a scarp 12 to a bottom portion 16. In traversing scarp 12, pipeline system 150 includes three regions, a positive buoyancy section 152, and two negative buoyancy sections 154A and 154B. Negative buoyancy sections 154A, 154B connect on either side of positive buoyancy section 152 and thereby allow a smooth transition before and after scarp 12 to allow pipeline 18 to approach the upper portion of scarp 12 and the bottom portion 16 tangentially. To prevent pipeline 18 from being displaced significantly by environmental forces, tethers 19 or other mooring systems can be used. The buoyancy of section 152 can be distributed such that pipeline 18 gently arcs and traverses over scarp 12 without inducing elevated stresses in the pipeline 18 cross section.

One benefit to pipeline system 150 of FIG. 2H is that extensive investigation into the geotechnical and topographic conditions at the top 14 and bottom 16 of scarp 12 is not necessary because no anchor device is used. For the same reason, this embodiment is not as sensitive to foundation conditions in the immediate vicinity of scarp 12. Often, the geological conditions at abruptly changing or steep slopes 14A will not be stable and efforts to install anchors or flexure control devices (item 36 in FIGS. 2B-2G) may not be successful. This benefit can partly apply to other embodiments where a tangential approach to the seabed is employed rather than an anchored flexure control device.

Figure 2I:
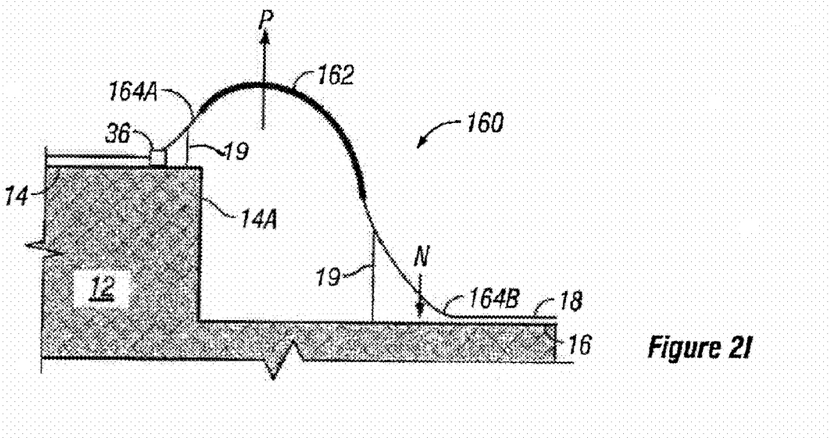
FIG. 2I is a schematic representation of the pipeline span of FIG. 2H wherein a first end of the pipeline span is connected to a flexure control device in accordance with a seventh embodiment of the present invention.

Referring now to FIG. 2I, a schematic representation of a distributed buoyancy pipeline system 160 in accordance with a seventh embodiment is shown. As with the system 150 of FIG. 2H, distributed buoyancy system 160 is constructed so that the flexure control device 36, or anchor, is offset from the cliff edge 14A at the top 14 of scarp 12. Distributed buoyancy system 160 is similar to system 120 of FIG. 2E except that flexure control device 36 is located further back at the top 14 of scarp 12. Distributed buoyancy pipeline system 160 includes a positively buoyed section 162 of pipeline 18 between negatively buoyed sections 164A and 164B of pipeline 18. The buoyancy and length of section 162 are designed to beneficially allow pipeline system 160 to extend further back from cliff edge 14A at top 14 of scarp 12, to a region where the placement of flexure control device 36 might be more appropriate. To reduce or prevent pipeline 18 from being displaced significantly by environmental forces, tethers 19 or other mooring systems can be used.

Figure 2J:
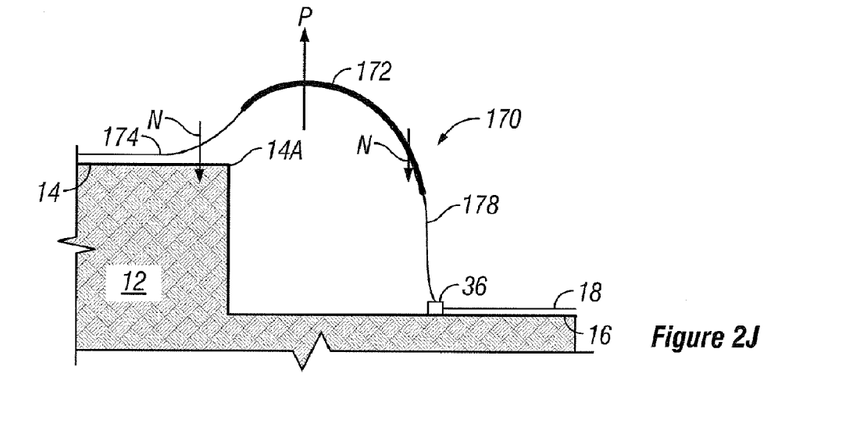
FIG. 2J is a schematic representation of the pipeline span of FIG. 2H wherein a second end of the pipeline span is connected to a flexure control device in accordance with an eighth embodiment of the present invention.

Referring now to FIG. 2J, a schematic representation of a distributed buoyancy pipeline system 170 in accordance with an eighth embodiment is shown. In contrast to other embodiments, distributed buoyancy system 170 includes a flexure control device 36 at the bottom 16 of scarp 12 with a free end of pipeline 18 set back from cliff edge 14A at top 14 of scarp. As a result, distributed buoyancy pipeline system 170 includes a positively buoyed section 172, a negative buoyancy section 174 at the top of the scarp, and a negative buoyancy section 178 extending between section 172 and flexure control device 36. As with FIGS. 2H-2I, pipeline 18 landing at top 14 of scarp 12 occurs far enough away from cliff edge 14A to make detailed investigation of the geological/geotechnical conditions of edge 14A less critical. This type of installation can be favorable for situations when the stability of the formation at the bottom 16 of scarp 12 is known to be conducive for anchoring and the stability at the top 14 is either unknown or is known to be non-conducive.

Figure 2K:
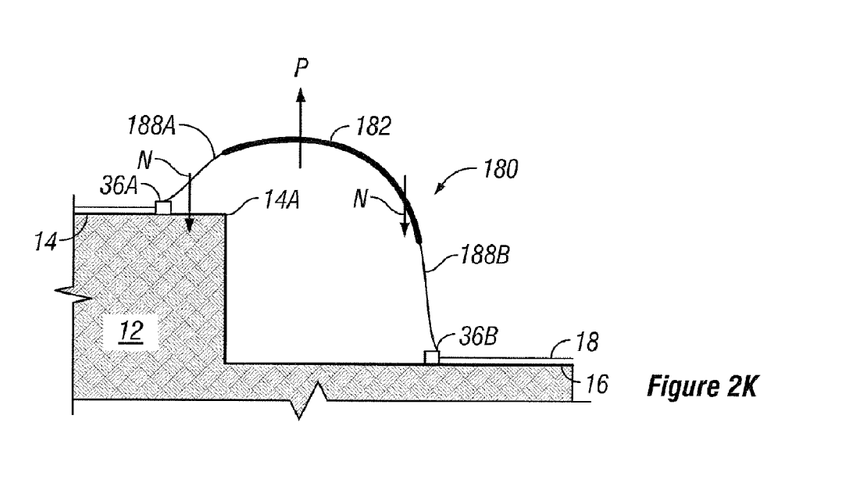
FIG. 2K is a schematic representation of the pipeline span of FIG. 2H wherein both ends of the pipeline span are connected to flexure control devices in accordance with a ninth embodiment of the present invention.

Referring now to FIG. 2K, a schematic representation of a distributed buoyancy pipeline system 180 in accordance with a ninth embodiment is shown. Similarly to distributed buoyancy pipeline system 140 of FIG. 2G, distributed buoyancy system 180 includes a pipeline 18 extending from the top 14 to the bottom 16 of a scarp 12 through two flexure control devices 36A, 36B. Distributed buoyancy pipeline system 180 includes a positive buoyancy section 182 and two negative buoyancy sections 188A, 188B. Distributed buoyancy system 180 is designed in a fashion that is similar to distributed buoyancy system 140 of FIG. 2G but with the exception of flexure control device 36A being set off from cliff edge 14A.

Figure 3A:
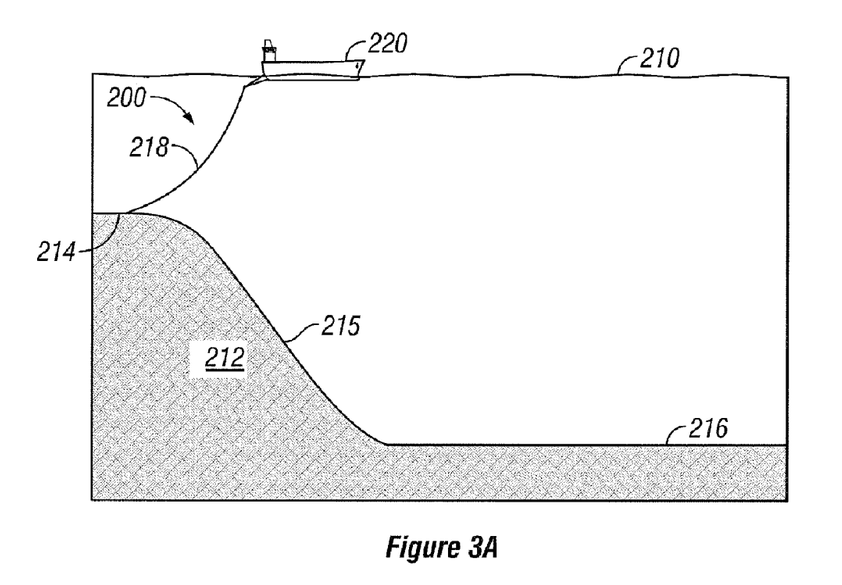
FIGS. 3A through 3E are schematic representations of a method used to deploy a distributed buoyancy pipeline in accordance with an embodiment of the present invention.

Referring now to FIGS. 3A-3E, one embodiment for a method to install a distributed buoyancy pipeline system 200 is disclosed. Referring initially to FIG. 3A, an undersea scarp 212 is shown below a waterline 210. Scarp 212 extends from a top, upper region 214 to a bottom, lower region 216 and includes a steep slope 215 therebetween. A pipeline-laying vessel 220 is shown in the early stages of laying a distributed buoyancy pipeline system 200. Pipeline laying vessel 220 may be of any configuration known by one of ordinary skill in the art, but is shown here as an S-lay type configuration. Other methods, appreciable to those skilled in the art, that may be used include J-lay and reel-lay configurations. Vessel 220 lays pipeline 218 as it would normally do until it nears undersea scarp 112.

Figure 3B:
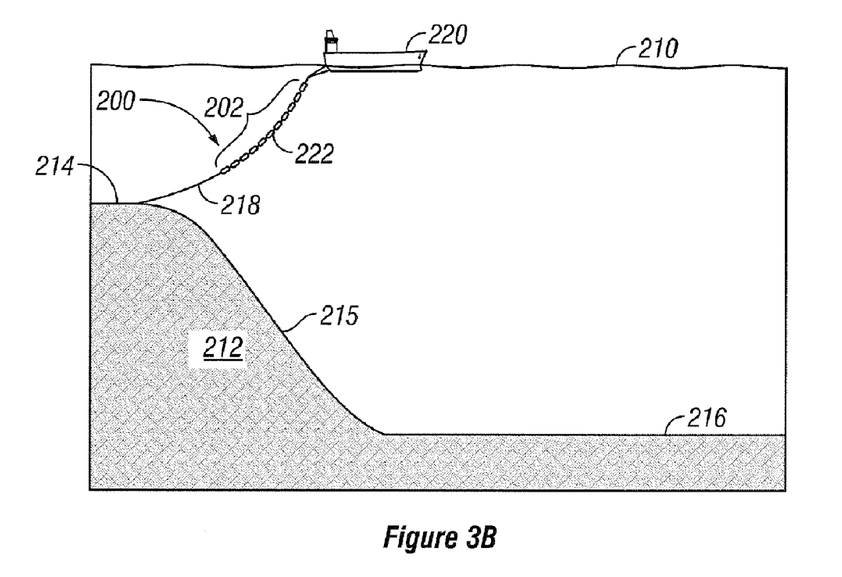

Referring now to FIG. 3B, as the vessel 220 crosses scarp 212, the crew installs buoyancy devices 222 to pipeline 218A thus creating positively buoyed section 202. Buoyancy devices 222 proceed down the lay apparatus, pipe lay stinger (not shown), into the water as vessel 220 traverses scarp 212 until the desired configuration and length of buoyancy section 202 is deployed.

Figure 3C:
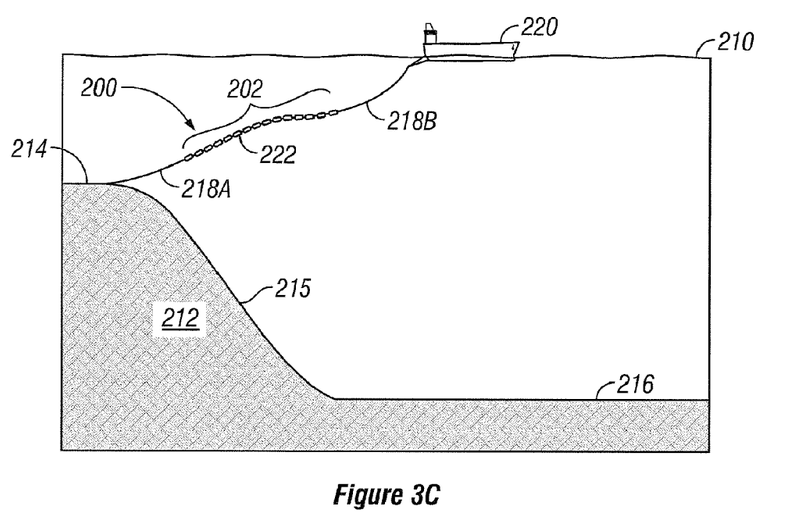
Figure 3D:
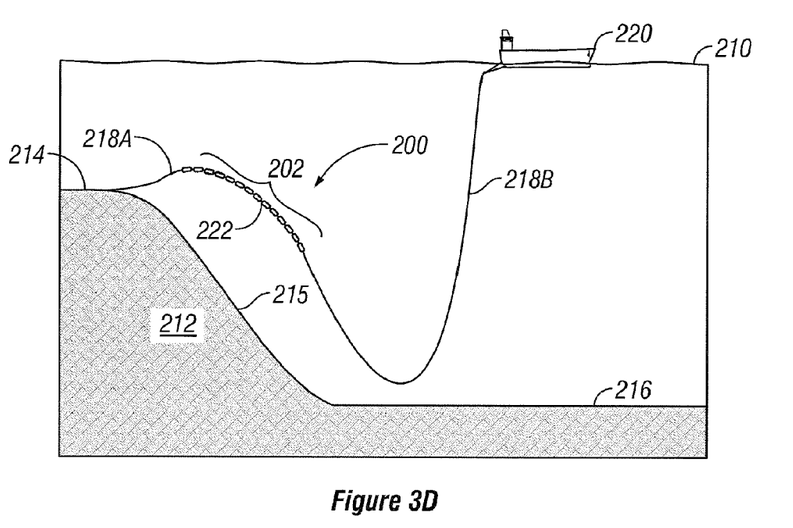

Referring to FIGS. 3C-3D, vessel 220 has deployed the desired number of buoyancy devices 222 and buoyancy section 202 configuration and length are set. Vessel 220 continues to lay pipeline system 200 by paying out pipeline 218B as it traverses across scarp 212 on ocean surface 210.

Figure 3E:
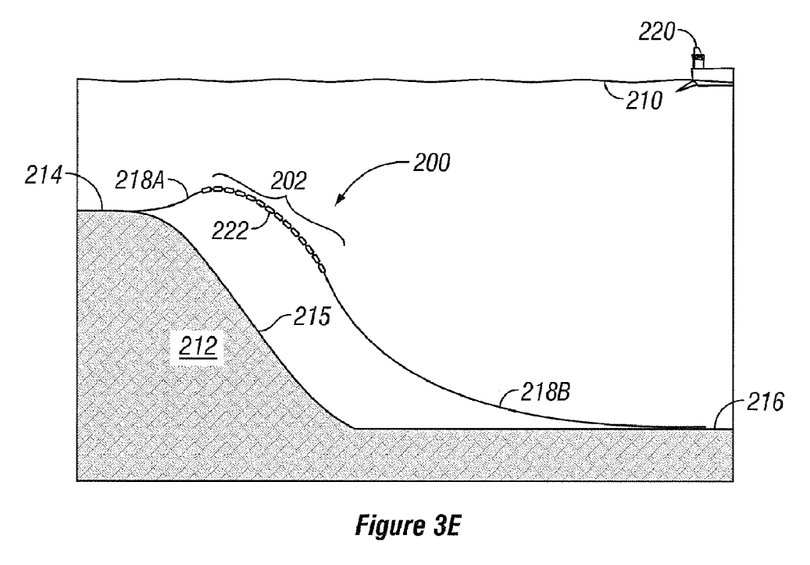

Referring now to FIG. 3E, the traversal of scarp 212 by distributed buoyancy pipeline system 200 has been completed. Distributed buoyancy pipeline system 200 now includes a pipeline 218A, 218B that extends from a top portion 214 to a bottom portion 216 of scarp 212. The portion traversing the slope 215 of scarp 212 desirably includes a plurality of distributed buoys 222 that together form a positive buoyancy section 202. The unbuoyed sections of pipeline 218A, 218B remain negatively buoyant. The positive buoyancy section 202 allows pipeline 218 to traverse scarp 212 without experiencing significant bending stresses or strains. A mooring system (not shown) may be deployed to restrict the displacement of pipeline 218 in its installed position.

Figure 4A:
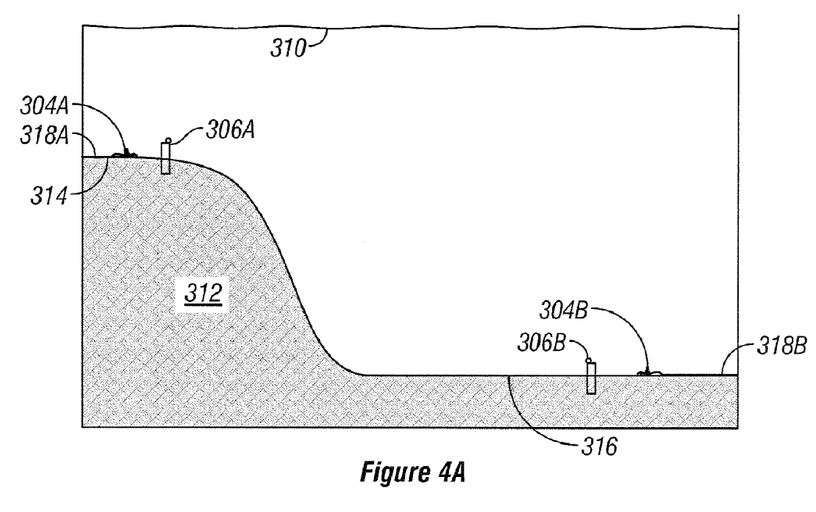
FIGS. 4A through 4H are schematic representations a second method used to deploy a distributed buoyancy pipeline in accordance with an embodiment of the present invention.

Referring generally to FIGS. 4A-4H, an alternative method for installing a distributed buoyancy pipeline system 300 is disclosed. This alternative method can be used when increased stability resulting from the presence of high currents or waves is desired. Referring specifically to FIG. 4A, an undersea scarp 312 is shown below a waterline 310. As shown in FIG. 4A, previous operations have resulted in the installation of anchoring devices 306A, 306B at the top 314 and bottom 316 of scarp 312. Anchoring devices 306A, 306B act to prevent axial and transversal movement of objects attached therefrom.

Pipeline 318A, 318B is laid to the approaches using traditional methods and is terminated with pipeline end connection devices 304A and 304B respectively. Pipelines 318A, 318B and pipeline end connection devices 304A, 304B are laid and secured into place using methods familiar to one of ordinary skill in the art. They may be installed prior to operations described by FIGS. 4B-4D or post operations described by FIGS. 4B-4D. If installed prior to operations described by FIG. 4B-4D, pipeline end connection devices may be combined with anchoring devices.

Figures 4B, 4C, 4D:
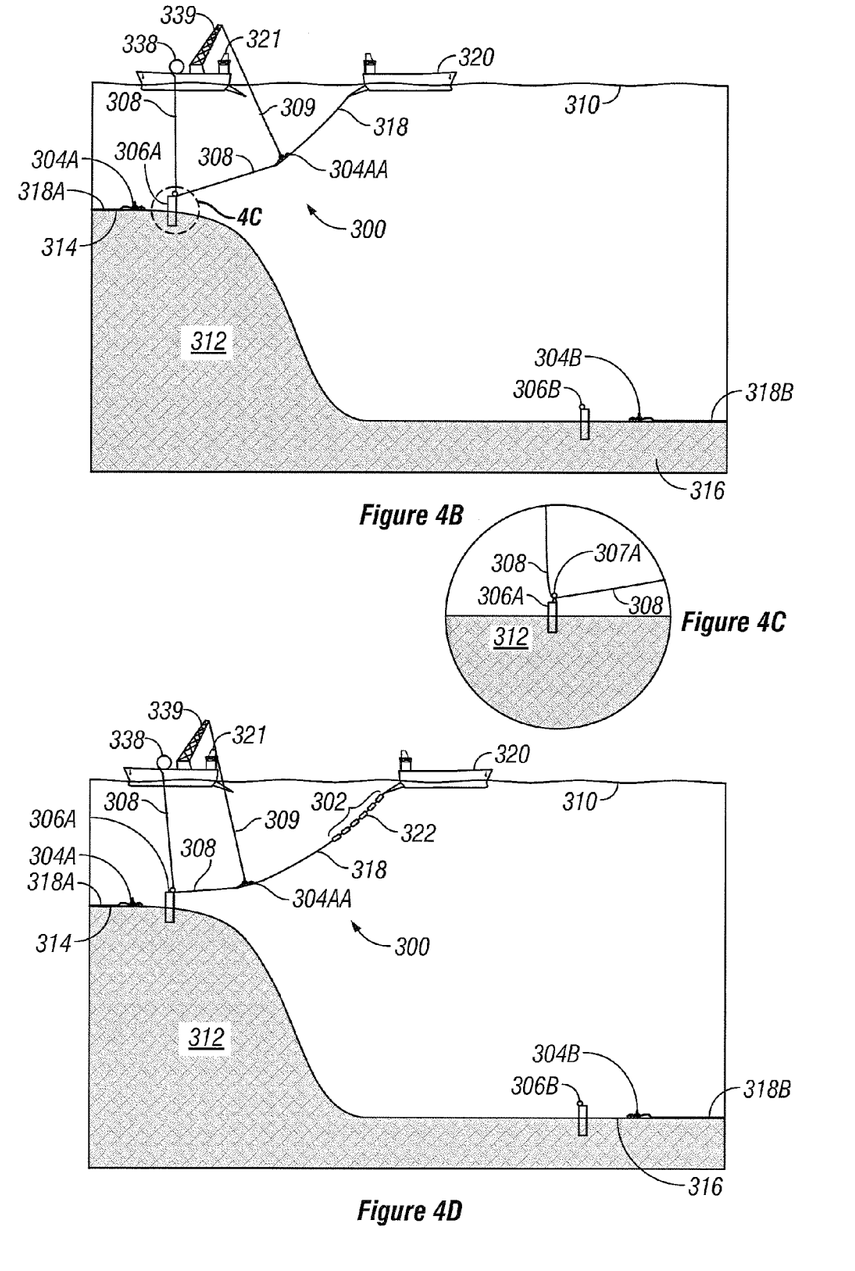

Referring now to FIGS. 4B and 4C, the installation of distributed buoyancy pipeline system 300 begins. First, pipelay vessel 320 begins pipeline initiation in a fashion known to one of ordinary skill in the art by welding initial pipe for pipeline 318 to pipeline end connection device 304AA at the pipe end which will initially enter the water. A support vessel 321 takes up station above anchoring device 306A. A pulling line 308 is rigged from a winch 338 on vessel 321 through sheave 307A on anchoring device 306A and to pipeline end connection device 304AA and on to vessel 321 again using methods known to one ordinarily skilled in the art. Pipelay of pipeline 318BB commences with winch 338 pulling connection device 304AA to the seabed proximate to anchoring device 306A. Optionally, additional support and orientation control for connection device 304AA may be provided by crane (or by winch or other pulling device) 339 on vessel 321 (or on another vessel 320) via line 309 to connection device 304AA.

Referring now to FIG. 4D, the installation of distributed buoyancy pipeline system 300 continues with pipe laying vessel 320 continuing to pay out pipeline 318AA, attaching distributed buoyancy devices 322 thereto, thus creating a distributed buoyancy section 302 of pipeline 318. While distributed buoyancy section 302 is shown schematically as a plurality of buoys, it should be understood by one of ordinary skill in the art that various other distributed buoyancy systems, including, but not limited to, buoyant coatings, buoyant pipe, or buoyant half-shells, may be used. As laying vessel 320 pays out pipeline, lifting vessel 321, in a coordinated effort, slowly pays out cable 309 and takes in cable 308 to guide pipeline end connection device 304AA to its destination. When pipeline end connection device 304AA is properly in position, lifting vessel 321 disconnects lines 309 and 308 and attaches a connection from 304AA to anchoring device 306A. Various means known to one skilled in the art exist to make structural and fluid conduit connections between connection 304AA, anchoring device 306A, and pipeline 318A, 318AA.

Figure 4E:
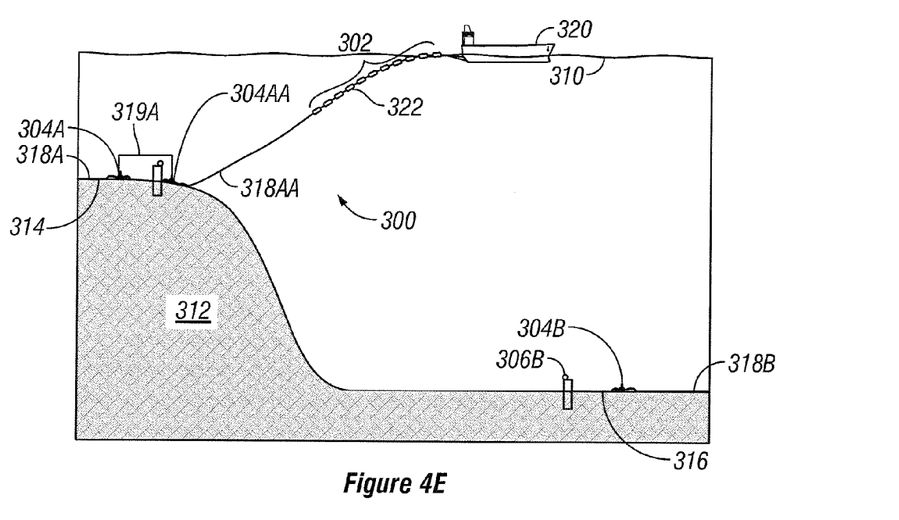

A jumper 319A is shown in FIG. 4E between the two pipeline end connection devices 304A, 304AA to make the fluid connection.

Figure 4F:
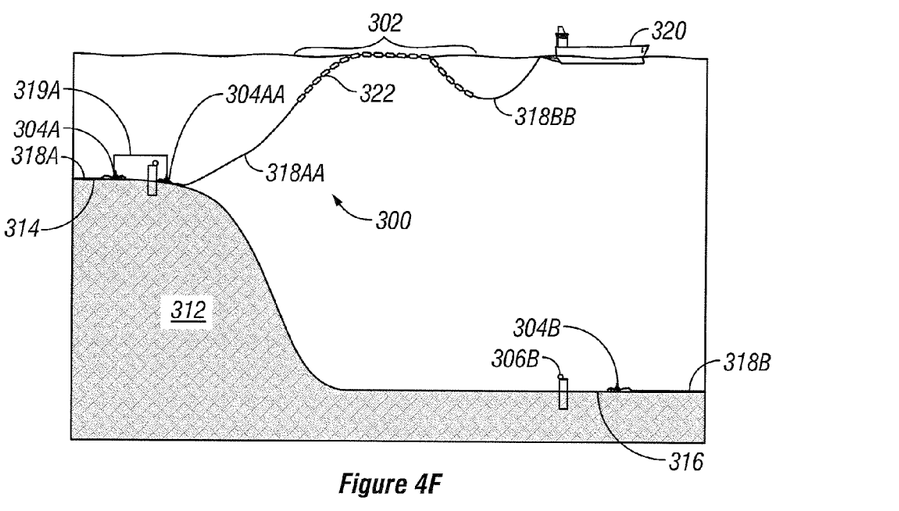

Referring now to FIG. 4F, the pipe laying vessel 320 has completed deploying the distributed buoyancy devices 322 to form the length of the distributed buoyancy section 302 of pipeline system 300 and is now continuing across scarp 312, paying out pipeline 318BB.

Figure 4G:
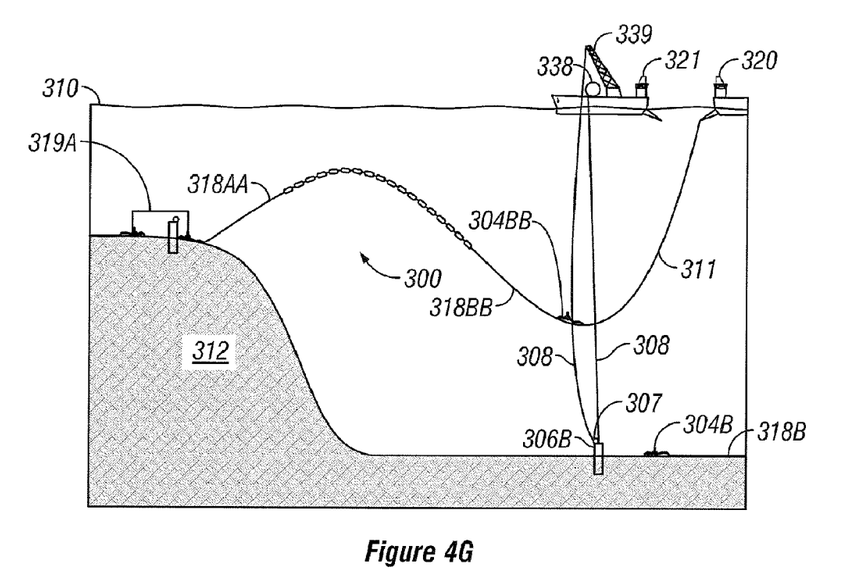

Referring now to FIG. 4G, the remainder of pipeline 318BB has been completed and pipeline end connection device 304BB has been installed on the end of pipeline 318BB which is last to enter the water. The pipeline end with connection device 304BB is lowered by means known to one skilled in the art to a location proximate to anchor device 306B. Lowering can employ laydown line 311 and the weight of the pipeline end connection device 304BB. Optionally, line 308 can be rigged from winch 338 on vessel 321 through sheave 307 on anchoring device 306B to pipeline end connection 304BB to draw connection device 304BB down to a location proximate to anchor device 306B. Optionally, additional support and orientation control for connection device 304BB may be provided by crane (or winching or other pulling device) 339 on vessel 321 (or on another vessel 320) via line 308 to connection device 304BB.

Figure 4H:
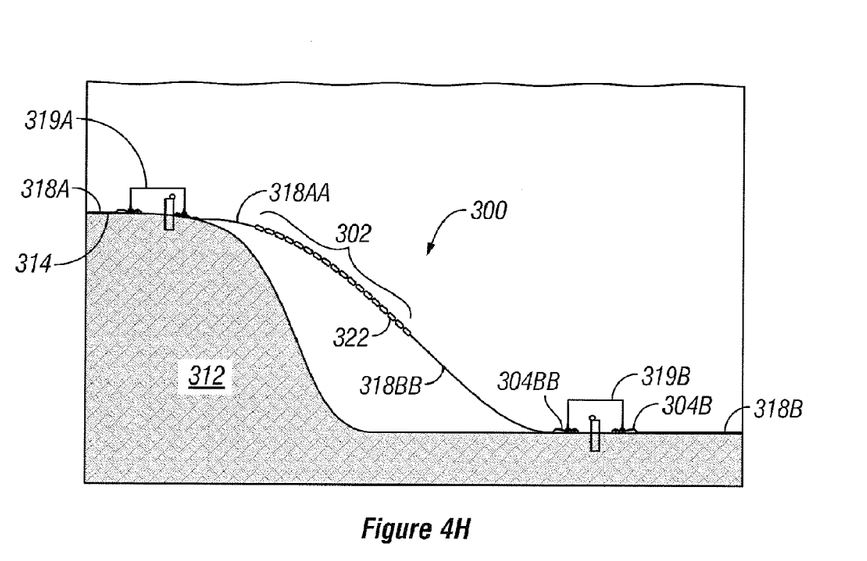

Once pipeline end connection device 304BB is in position, an operation is performed to connect pipeline end connection devices 304B and 304BB together for fluid communication with a jumper 319B. With jumpers 319A and 319B in place, pipeline system 300, as shown in FIG. 4H, is ready to transfer hydrocarbons therethrough.

It should be understood by one of ordinary skill in the art that pipeline installations in accordance with the disclosed embodiments of the present invention are intended to be for permanent undersea pipeline installation. Other pipeline systems may exist to use buoyancy in the laying of subsea pipeline, but such systems are either temporary in nature or do not use distributed buoyancy in their designs.

Numerous embodiments and alternatives thereof have been disclosed. While the above disclosure includes the best mode belief in carrying out the invention as contemplated by the named inventors, not all possible alternatives have been disclosed. For that reason, the scope and limitation of the present invention is not to be restricted to the above disclosure, but is instead to be defined and construed by the appended claims.

What is claimed is:

1. An apparatus to traverse an undersea escarpment, comprising:
a subsea pipeline constructed to carry fluids across the undersea escarpment between a top of the escarpment and a bottom of the escarpment; wherein:
said pipeline comprising at least one distributed buoyancy region;
said pipeline comprising a first unbuoyed pipeline section extending from the top of the escarpment on a sea floor to said distributed buoyancy region and a second unbuoyed pipeline section extending from said distributed buoyancy region to the bottom of the escarpment on the sea floor; and
said distributed buoyancy region comprising two or more spatially arranged discrete buoyancy solutions directly attached to said distributed buoyancy region to create a positively buoyant inverse catenary section connecting said first and second pipeline sections in fluid communication when said distributed buoyancy solutions are located below the waterline; and
a flexure control device disposed at the top of the escarpment and located between said first unbuoyed pipeline section and said distributed buoyancy region, wherein the distributed buoyancy region rises above the flexure control device at the top of the escarpment before connecting to the second unbuoyed pipeline section.

2. The apparatus of claim 1 wherein each discrete buoyancy solution comprises one or more buoyancy-providing modules disposed along a length of said pipeline.

3. The apparatus of claim 1 wherein each discrete buoyancy solution comprises a coating of buoyant material.

4. The apparatus of claim 1 further comprising a tether system to retain said pipeline in position and to resist forces of undersea currents.

5. The apparatus of claim 1 wherein said first and said second pipeline sections are negatively buoyant.

6. The apparatus of claim 1 wherein the flexure control device is located proximate to an edge of the undersea escarpment.

7. The apparatus of claim 1 wherein the flexure control device is located distant to an edge of the undersea escarpment.

8. The apparatus of claim 1, further comprising a second flexure control device disposed at the bottom of the escarpment and located between the second unbuoyed pipeline section and the distributed buoyancy region to reduce bending stress and strain in the second unbuoyed pipeline section.

9. A pipeline for traversing an undersea escarpment, comprising:
a first unbuoyed section located subsea and extending from a top of the undersea escarpment on the seabed;
a second unbuoyed section located subsea and extending from a bottom of the undersea escarpment on the seabed; and
at least one positively buoyant inverse catenary section disposed between the first and second unbuoyed sections, wherein the positively buoyant inverse catenary section comprises two or more spatially arranged buoyancy solutions directly attached to an outer diameter thereof to provide a positively buoyant inverse catenary section when the buoyancy solutions are located below the waterline, wherein the first and second unbuoyed sections are in fluid communication with one another via the positively buoyant inverse catenary section, and wherein the at least one positively buoyant inverse catenary section traverses the undersea escarpment.

10. The pipeline of claim 9, wherein at least one buoyancy solution comprises one or more discrete buoyancy-providing modules.

11. The pipeline of claim 10, wherein the buoyancy-providing module is a buoy.

12. The pipeline of claim 10, wherein the buoyancy-providing module is a tethered buoy.

13. The pipeline of claim 9, wherein at least one buoyancy solution is a buoyant coating.

14. The pipeline of claim 10, wherein the discrete buoyancy-providing module comprises a buoyant coating, buoy, or both.

15. An apparatus to traverse an escarpment located on a seabed, comprising:
a subsea pipeline constructed to carry fluids across the escarpment between a top of the escarpment and a bottom of the escarpment; wherein:

said pipeline comprising at least one distributed buoyancy region;

said pipeline comprising a first unbuoyed pipeline section extending from the top of the escarpment on a sea floor to said distributed buoyancy region and a second unbuoyed pipeline section extending from said distributed buoyancy region to the bottom of the escarpment on the sea floor; and said distributed buoyancy region comprising two or more spatially arranged discrete buoyancy solutions directly attached to said distributed buoyancy region to create a self-supporting, positively buoyant, inverse catenary section connecting said first and said second pipeline sections in fluid communication;

a first flexure control device disposed at the top of the escarpment and located between said first unbuoyed pipeline section and said distributed buoyancy region; and a second flexure control device disposed at the bottom of the escarpment and located between the second unbuoyed pipeline section and the distributed buoyancy region.

16. The apparatus of claim 15 wherein at least one buoyancy solution comprises a buoyancy-providing module disposed along a length of said distributed buoyancy region.

17. The apparatus of claim 16 wherein the buoyancy-providing module is a tethered buoy.

18. The apparatus of claim 15 wherein the buoyancy solutions comprise a coating of buoyant material.

19. The apparatus of claim 15 wherein said first and said second pipeline sections are negatively buoyant.

* * * * *